US009582037B2

(12) United States Patent
Kaneko

(10) Patent No.: US 9,582,037 B2
(45) Date of Patent: Feb. 28, 2017

(54) DOCKING STATION, CONTROL METHOD AND COMMODITY SALES DATA PROCESSING APPARATUS

(71) Applicant: TOSHIBA TEC KABUSHIKI KAISHA, Tokyo (JP)

(72) Inventor: Toshihiro Kaneko, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/981,350

(22) Filed: Dec. 28, 2015

(65) Prior Publication Data

US 2016/0231778 A1   Aug. 11, 2016

(30) Foreign Application Priority Data

Feb. 10, 2015 (JP) .................................. 2015-024230

(51) Int. Cl.
*G06F 1/16* (2006.01)
*G06F 13/00* (2006.01)

(52) U.S. Cl.
CPC .................................. *G06F 1/1632* (2013.01)

(58) Field of Classification Search
CPC ..................................................... G06F 1/1632
USPC ................ 361/679.41–679.45; 710/303, 304
See application file for complete search history.

(56) References Cited

U.S. PATENT DOCUMENTS

| | | | | |
|---|---|---|---|---|
| 5,526,493 A | * | 6/1996 | Shu | G06F 1/1632 361/679.41 |
| 5,598,539 A | * | 1/1997 | Gephardt | G06F 1/1632 710/304 |
| 5,619,397 A | * | 4/1997 | Honda | G06F 1/1632 361/679.43 |
| 5,832,237 A | * | 11/1998 | Lee | G06F 13/4081 710/303 |
| 5,864,294 A | * | 1/1999 | Hsu | G06F 1/1632 340/635 |
| 6,119,237 A | * | 9/2000 | Cho | G06F 1/1632 710/303 |
| 6,209,105 B1 | * | 3/2001 | Hamamoto | G06F 1/1632 710/303 |

(Continued)

FOREIGN PATENT DOCUMENTS

JP    2012137979    7/2012

*Primary Examiner* — Nidhi Thaker
(74) *Attorney, Agent, or Firm* — Patterson & Sheridan, LLP

(57) ABSTRACT

In one embodiment, a docking station on which a data processing terminal is to be mounted has a power source device and a processor. The power source device applies an operating voltage of the data processing terminal and a testing voltage lower than the operating voltage to a power feeding terminal which is in contact with a power source terminal of the data processing terminal. The processor, when having determined that the mounting mechanism is locked, controls the power source device, so that the testing voltage is applied to the power feeding terminal. Further, the processor, when having determined that the mounting mechanism is locked and having determined that the data processing terminal is mounted on the mounting mechanism, controls the power source device, so that the operating voltage is applied to the power feeding terminal.

10 Claims, 7 Drawing Sheets

(56) References Cited

U.S. PATENT DOCUMENTS 8,255,720 B1 * 8/2012 Conway ............... G01C 21/265
 455/573
8,553,408 B2 * 10/2013 Supran ................. G06F 1/1632
 361/679.02

* cited by examiner

DOCKING STATION, CONTROL METHOD AND COMMODITY SALES DATA PROCESSING APPARATUS

CROSS-REFERENCE TO RELATED APPLICATION

This application is based upon and claims the benefit of priority from the prior Japanese Patent Application No. 2015-024230, filed on Feb. 10, 2015, the entire contents of which are incorporated herein by reference.

FIELD

Embodiments described herein relate generally to a docking station, a commodity sales data processing apparatus including this docking station, and a control method of the docking station.

BACKGROUND

A docking station on which a portable data processing terminal is detachably mounted is known. A docking station of this kind, when a data processing terminal is mounted thereon, is provided with a power feeding function to feed an operating power of the relevant data processing terminal to the relevant data processing terminal, in many cases. The docking station provided with this power feeding function may feed power of such a high voltage as 19 V, for example, to the data processing terminal, in order to rapidly charge a battery incorporated in the data processing terminal.

In the above-described docking station, it is preferable that when the data processing terminal is demounted, application of a voltage for power feeding to a power feeding terminal which is in contact with a power source terminal at the data processing terminal side is stopped. The above-described conventional docking station has detected whether or not the data processing terminal is mounted using a mechanical switch, to control application of a voltage to the power feeding terminal.

However, in the mechanical switch, erroneous detection might be made by an object other than the data processing terminal. For this reason, in the above-described docking station, power might be fed to the power feeding terminal, in the state that the data processing terminal is not mounted.

DETAILED DESCRIPTION

Figure 1:
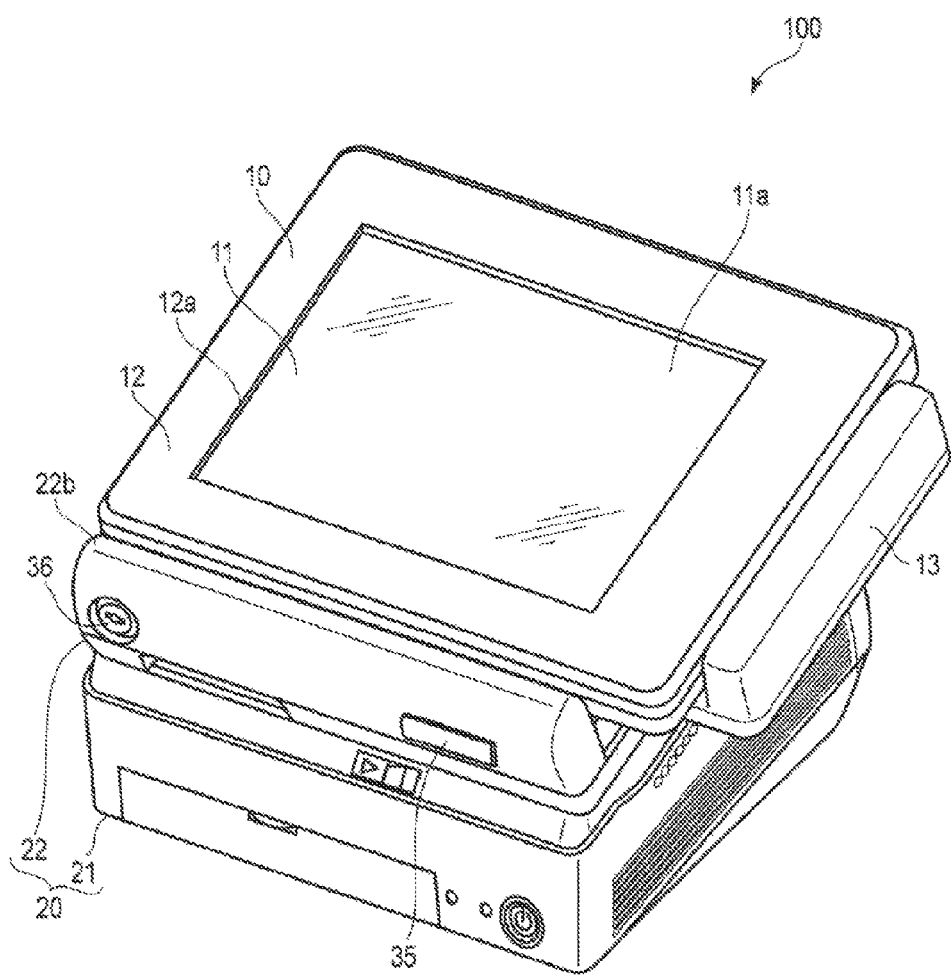
FIG. 1 is a perspective view showing an external appearance of a commodity sales data processing apparatus according to an embodiment.

According to one embodiment, a portable data processing terminal is to be detachably mounted on a docking station. The docking station has a mounting mechanism, a lock mechanism, a power feeding terminal, a power source device, a first sensor, a second sensor, and a processor.

The mounting mechanism has a first movable member to operate in accordance with mounting of the data processing terminal and demounting of the data processing terminal, and the data processing terminal is to be mounted on the mounting mechanism.

The lock mechanism regulates movement of the first movable member, to lock the mounting mechanism.

The power feeding terminal, when the data processing terminal is mounted on the mounting mechanism, comes in contact with a power source terminal provided in the data processing terminal.

The power source device applies an operating voltage of the data processing terminal and a testing voltage lower than the operating voltage to the power feeding terminal.

The first sensor detects locking of the mounting mechanism by the lock mechanism.

The second sensor detects an electrical state of the power feeding terminal in a state that the testing voltage is applied thereto by the power source device.

The processor, when having determined that the mounting mechanism is locked based on a detection result of the first sensor, controls the power source device, so that the testing voltage is applied to the power feeding terminal.

Further, the processor, when having determined that the mounting mechanism is locked and further having determined that the data processing terminal is mounted on the mounting mechanism based on a detection result by the second sensor, controls the power source device, so that the operating voltage is applied to the power feeding terminal.

Hereinafter, further embodiments will be described with reference to the drawings. In the drawings, the same symbols indicate the same or similar portions.

Figure 2:
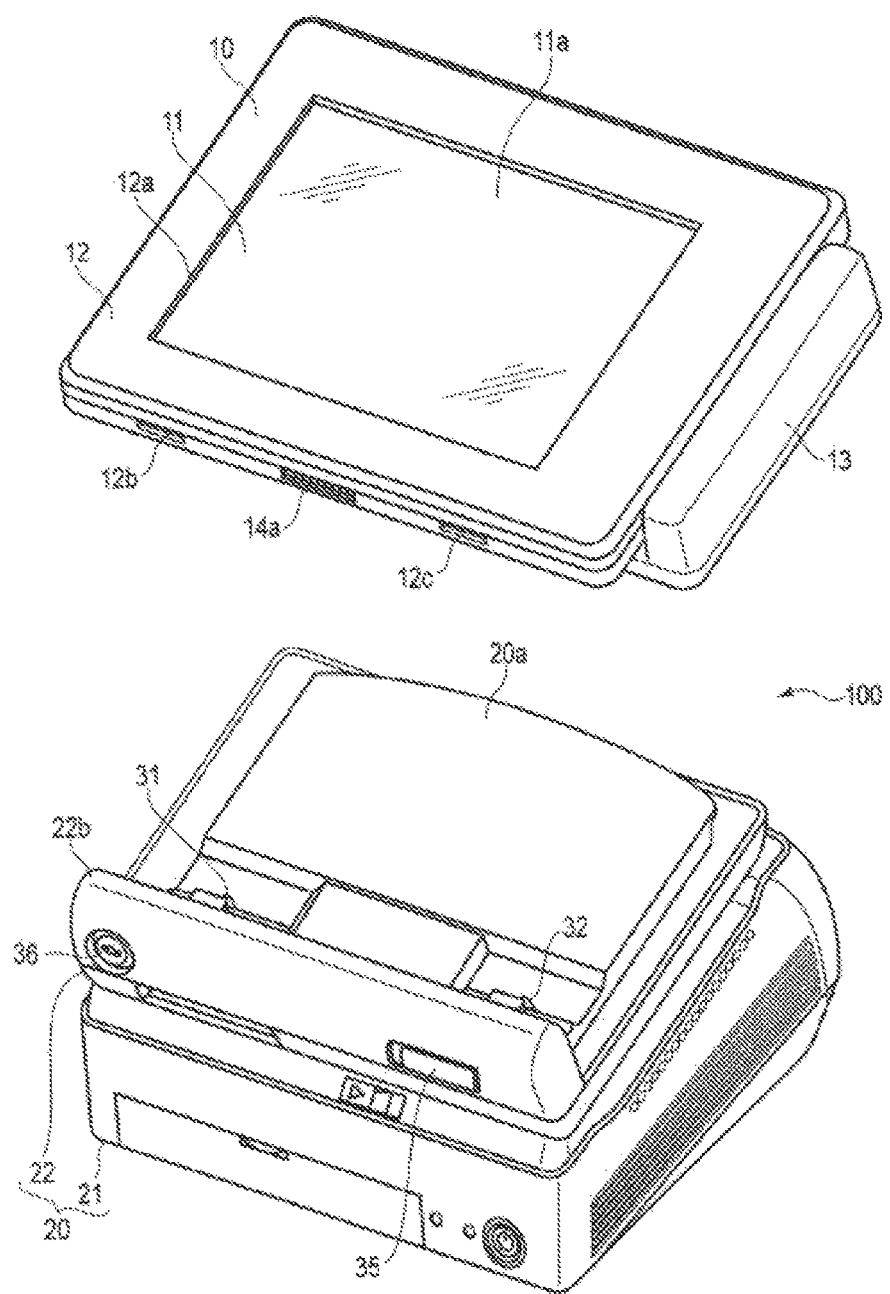
FIG. 2 is a perspective view showing an external appearance of the commodity sales data processing apparatus according to the embodiment.
Figure 3:
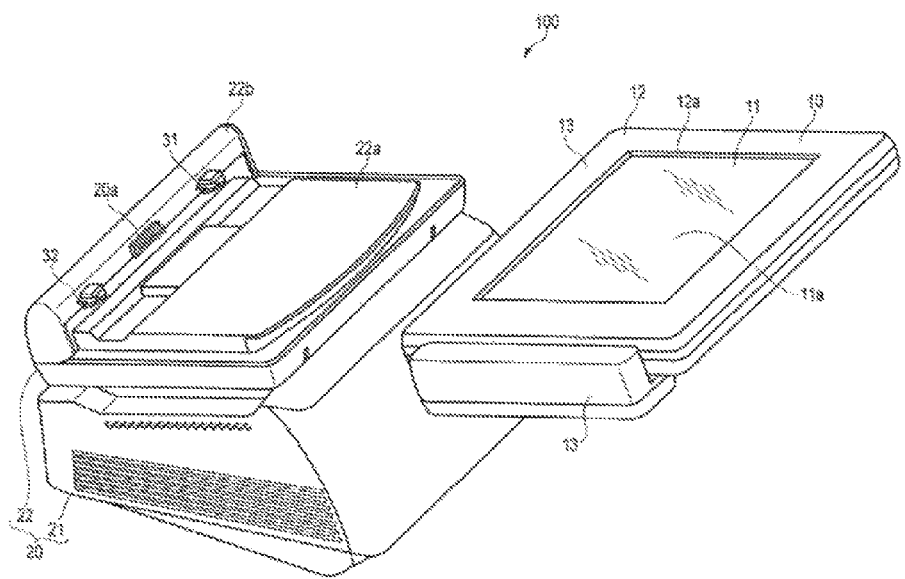
FIG. 3 is a perspective view showing an external appearance of the commodity sales data processing apparatus according to the embodiment.

FIG. 1 to FIG. 3 are perspective views showing respective external appearances of a commodity sales data processing apparatus (hereinafter, abbreviated as "processing apparatus") 100 according to the present embodiment.

The processing apparatus 100 includes a data processing terminal 10 and a docking station 20.

The data processing terminal 10 and the docking station 20 are separate apparatuses to each other. The data processing terminal 10 is detachably mounted on the docking station 20. The processing apparatus 100 can become in two states shown in FIG. 1 and FIG. 2 (or FIG. 3). The state of the processing apparatus 100 shown in FIG. 1 is a state that the data processing terminal 10 is mounted on the docking station 20. Specifically, the data processing terminal 10 is mounted on a mounting mechanism 30S of the docking station 20, as will be described later.

Hereinafter, the state of the docking station 20 or the mounting mechanism 30S of the docking station 20 on which the data processing terminal 10 is mounted is called a mounting state.

The state of the processing apparatus 100 shown in FIG. 2 (or FIG. 3) is a state that the data processing terminal 10 is demounted from the docking station 20. Specifically, the data processing terminal 10 is demounted from the mounting mechanism 30S of the docking station 20, as will be described later.

Hereinafter, the state of the docking station 20 or the mounting mechanism 30S of the docking station 20 from which the data processing terminal 10 has been demounted is called a separation state. In addition, FIG. 2 and FIG. 3 are perspective views showing external appearances of the processing apparatus 100 seen from different viewpoints, respectively.

The data processing terminal 10 is configured such that a personal computer of a tablet type (hereinafter, referred to as a tablet PC) 11 is covered with a jacket 12.

The jacket 12 has an opening 12a, to expose an operation surface of a touch panel 11a of the tablet PC 11 outside via this opening 12a.

A reader/writer 13 and a connector 14a are provided on the jacket 12. The connector 14a electrically connects the data processing terminal 10 to the docking station 20.

The reader/writer 13 reads out data recorded in a data card. The reader/writer 13 writes data into a data card. The data card includes a settlement card such as a credit card, a debit card, an electronic money card, a prepaid card. Further, the data card includes various cards to record information relating to the settlement processing, such as a membership card or a point card. The reader/writer 13 may be any device of a magnetic type, a contact type, or a noncontact type, and may include these plural kinds of devices. In addition, the reader/writer 13 shown in FIG. 1 and FIG. 2 is a magnetic type device.

The docking station 20 has a main body 21 and a table 22. The main body 21 is formed of a box type which can be installed in a stationary manner. The table 22 is fitted on an upper surface of the main body 21.

The main body 21 houses a lot of electrical constituent elements described later. But, parts of the electrical constituent elements are provided on the table.

The table 22 includes a placing surface 22a and a projecting portion 22b.

The placing surface 22a contacts the rear surface of the data processing terminal 10 in the above-described mounting state, to thereby hold the data processing terminal 10 in the posture shown in FIG. 1.

The projecting portion 22b is provided along one side of the table 22, in the state to project from the placing surface 22a. The projecting portion 22b supports a connector 20a, in the state to project toward the side of the placing surface 22a. The projecting portion 22b houses a lock mechanism 30R and the mounting mechanism 30S.

Figure 4:
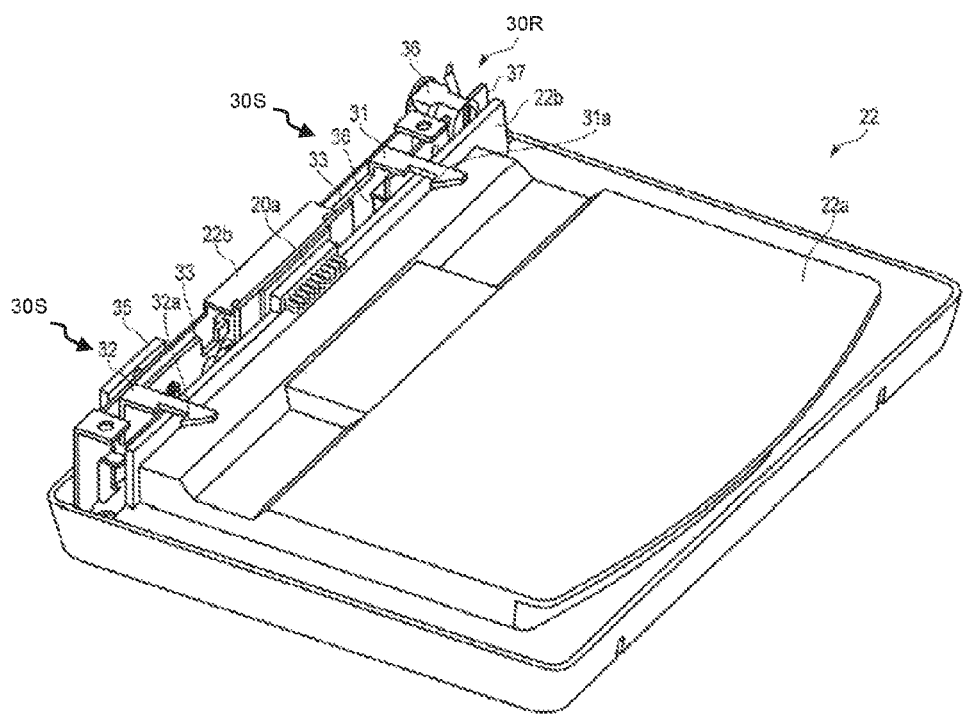
FIG. 4 is a perspective view showing a lock mechanism and a mounting mechanism used in the docking station of the commodity sales data processing apparatus according to the embodiment.

FIG. 4 is a perspective view showing the lock mechanism 30R and the mounting mechanism 30S.

The table 22 shown in FIG. 4 is in the state that a part of the cover of the projecting portion 22b is removed, so as to show the housing state of the lock mechanism 30R and the mounting mechanism 30S in the projecting portion 22b.

Figure 5:
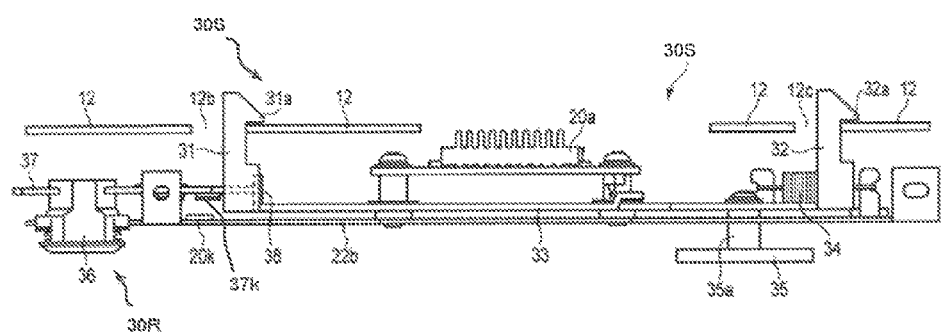
FIG. 5 is a plan view showing the lock mechanism and the mounting mechanism used in the docking station of the commodity sales data processing apparatus according to the embodiment.

FIG. 5 is a plan view of the lock mechanism 30R and the mounting mechanism 30S.

The mounting mechanism 30S has first movable members 31, which act in accordance with mounting of the data processing terminal 10 and demounting of the data processing terminal 10, and the data processing terminal 10 is mounted thereon. Further, the data processing terminal 10 includes a connecting plate 33, a pressing plate 38, a spring 34, and a slide button 35.

The lock mechanism 30R regulates the movement of the first movable members (hooks 31, 32), to lock the mounting mechanism 30S. The lock mechanism 30R includes a cylinder lock 36 and a second movable member 37.

The first movable members 31, 32 are respectively the hooks 31, 32 each of which can move between a first position and a second position.

The above-described first position is a position (a position shown in FIG. 5) where each of the hooks 31, 32 engages with the data processing terminal 10 in the above-described mounting state, and also each of the hooks 31, 32 stands by in the above-described separation state.

The above-described second position is a position separated from the first position to which each of the hooks 31, 32 moves, when the state of the above-described mounting mechanism 30S changes from the above-described mounting state to the above-described separation state, and changes from the above-described separation state to the above-described mounting state.

The hooks 31, 32 have elongated flat plate shapes, for example, and have respective protrusions 31a, 32a, each of which protrudes toward a direction crossing the longitudinal direction thereof (a right direction in FIG. 5) at its tip. In each of the hooks 31, 32, the above-described tip projects from the projecting portion 22b toward the placing surface 22a side.

The hooks 31, 32 are arranged in the same direction, and in parallel with each other. Each of the hooks 31, 32 is movable between the above-described first position and the above-described second position, in the direction of the above-described arrangement (in the horizontal direction in FIG. 5).

The protrusions 31a, 32a of the hooks 31, 32 enter into the inside of the jacket 12 from openings 12b, 12b (refer to FIG. 2 and FIG. 5) provided in the jacket 12, respectively, in the above-described mounting state. The protrusions 31a, 32a enter into the inside of the jacket 12 from the openings 12b, 12c, respectively, and thereby the hooks 31, 32 engage with the data processing terminal 10.

The connecting member 33 has an elongated flat plate shape. Hereinafter, the connecting member 33 is called a connecting plate 33. The connecting plate 33 connects the hooks 31, 32, so that the hooks 31, 32 are arranged in the same direction and in parallel with each other.

The connecting plate 33 is movable in accordance with the above-described movement of the hooks 31, 32.

The connecting plate 33 is supported by the projecting portion 22b so as not to prevent the hooks 31, 32 from moving in the direction of the arrangement.

The spring 34 is an elastic member.

The spring 34 energizes the hooks 31, 32 and the connecting plate 33 in the direction of the protrusions 31a, 32a (right direction in FIG. 5), while making them movable in the direction (left direction in FIG. 5) opposite to the direction of the protrusions 31a, 32a.

That is, the spring 34 energizes the hooks 31, 32 via the connecting plate 33, so that the hooks 31, 32 are positioned at the above-described first positions, while making them movable to the above-described second positions, respectively.

The slide button 35 is fixed to the connecting plate 33 via a shaft 35a. The slide button 35 is positioned outside the projecting portion 22b, so that it can be operated by an operator. The shaft 35a moves along with the connecting plate 33 in the same direction as the arrangement direction of the hooks 31, 32. A through hole (not shown) which does not prevent the above-described movement of the shaft 35*a* is formed in the projecting portion 22*b*.

An operator operates the slide button 35, and thereby can move the hooks 31, 32 between the above-described first positions and the above-described second positions, respectively, via the connecting plate 33.

The cylinder lock 36 can be unlocked and locked by a specific operation of an operator. Specifically, the cylinder lock 36 is a lock in which an inner cylinder (not shown) can be rotated only by a specific key. The inner cylinder of the cylinder lock 36 is rotated by a specific operation by an operator with a specific key, so as to unlock or lock the cylinder lock 36. That is, the cylinder lock 36 can take selectively a first state that is a locked state, and a second state that is an unlocked state, by the rotation of the inner cylinder.

The second movable member 37 is a flat plate shaped member, for example. Hereinafter, the second movable member 37 is called a movable plate 37.

The movable plate 37 reciprocates between a regulation position and a non-regulation position in the arrangement direction (horizontal direction in FIG. 5) of the hooks 31, 32, in accordance with the rotation of the inner cylinder of the cylinder lock 36.

The regulation position is a position where the movable plate 37 regulates the movement of the hooks 31, 32, as will be described later.

The non-regulation position is a position where the movable plate 37 does not regulate the movement of the hooks 31, 32.

That is, the regulation position is a position where the lock mechanism 30R regulates the movement of the hooks 31, 32, and the non-regulation position is a position where the lock mechanism 30R does not regulate the movement of the hooks 31, 32.

The movable plate 37 is positioned at the regulation position shown in FIG. 5, when the cylinder lock 36 is in the first state.

The movable plate 37 moves from the regulation position shown in FIG. 5 to the non-regulation position at the left side in FIG. 5, when the cylinder lock 36 is changed from the first state to the second state.

The pressing plate 38 has a flat plate shape, and is fixed to the end portion (left side end portion in FIG. 5) of the connecting plate 33.

The movable plate 37 of the cylinder lock 36 is pressed to the pressing plate 38 at the regulation position shown in FIG. 5, when the cylinder lock 36 is in the above-described first state.

Accordingly, when the cylinder lock 36 is in the above-described first state, the lock mechanism 30R unmovably fixes the hooks 31, 32 to the above-described first positions, to regulate the movement of the hooks 31, 32.

That is, the lock mechanism 30R regulates the movement of the hooks 31, 32, to lock the mounting mechanism 30S.

In addition, when the cylinder lock 36 is in the above-described second state, the hooks 31, 32 can move, but are normally positioned at the first positions by the energization by the spring 34, respectively. When the cylinder spring 36 is in the second state, if the slide button 35 is slid in the left direction of FIG. 5 by an operator, the connecting plate 33 moves in the same direction. The hooks 31, 32 move from the first positions to the second positions, respectively, in accordance with the movement of the connecting plate 33.

Hereinafter, the state of the lock mechanism 30R when the cylinder lock 36 is in the above-described first state is called a lock state.

On the other hand, the state of the lock mechanism 30R when the cylinder lock 36 is in the above-described second state is called an unlock state.

That is, the lock mechanism 30R becomes in the lock state to lock the mounting mechanism 30S, and in the unlock state not to lock the mounting mechanism 30S, by a specific operation by an operator.

In the lock state, the hooks 31, 32 of the mounting mechanism 30S are unmovably fixed at the first positions shown in FIG. 5, respectively, as described above.

In the unlock state, the hooks 31, 32 are movable from the first positions shown in FIG. 5 to the second positions in the left direction in the drawing, respectively.

In addition, in the above-described mounting state, the protrusions 31*a*, 32*a* of the hooks 31, 32 are hooked in the openings 12*b*, 12*c* of the jacket 12, to engage with the jacket 12, respectively.

In the above-described mounting state, when the lock mechanism 30R becomes in the lock state, the engagement state of the hooks 31, 32 and the jacket 12 is fixed. In other words, the hooks 31, 32 become unable to move from the first positions to the second positions, respectively, in the state that they engage with the jacket 12.

That is, in the above-described mounting state, when the lock mechanism 30R becomes in the lock state, an operator becomes unable to set the above-described mounting state to the above-described separation state.

In addition, in the above-described separation state, the protrusions 31*a*, 32*a* of the hooks 31, 32 are not engaged with the jacket 12, respectively.

In the separation state, when the lock mechanism 30R becomes in the lock state, the hooks 31, 32 becomes in the state that they cannot be engaged with the jacket 12. In other words, in the same manner as described above, the hooks 31, 32 become unable to move from the first positions to the second positions, respectively, in the state not to be engaged with the jacket 12.

That is, in the above-described separation state, when the lock mechanism 30R becomes in the lock state, an operator also becomes unable to set the above-described separation state to the above-described separation state.

On the other hand, in the unlock state, it is possible that the hooks 31, 32 engage with the jacket 12, and they are disengaged from the jacket 12.

That is, when the lock mechanism 30R becomes in the unlock state, an operator becomes able to set the above-described mounting state to the above-described separation state, and also set the above-described separation state to the above-described mounting state.

Figure 6:
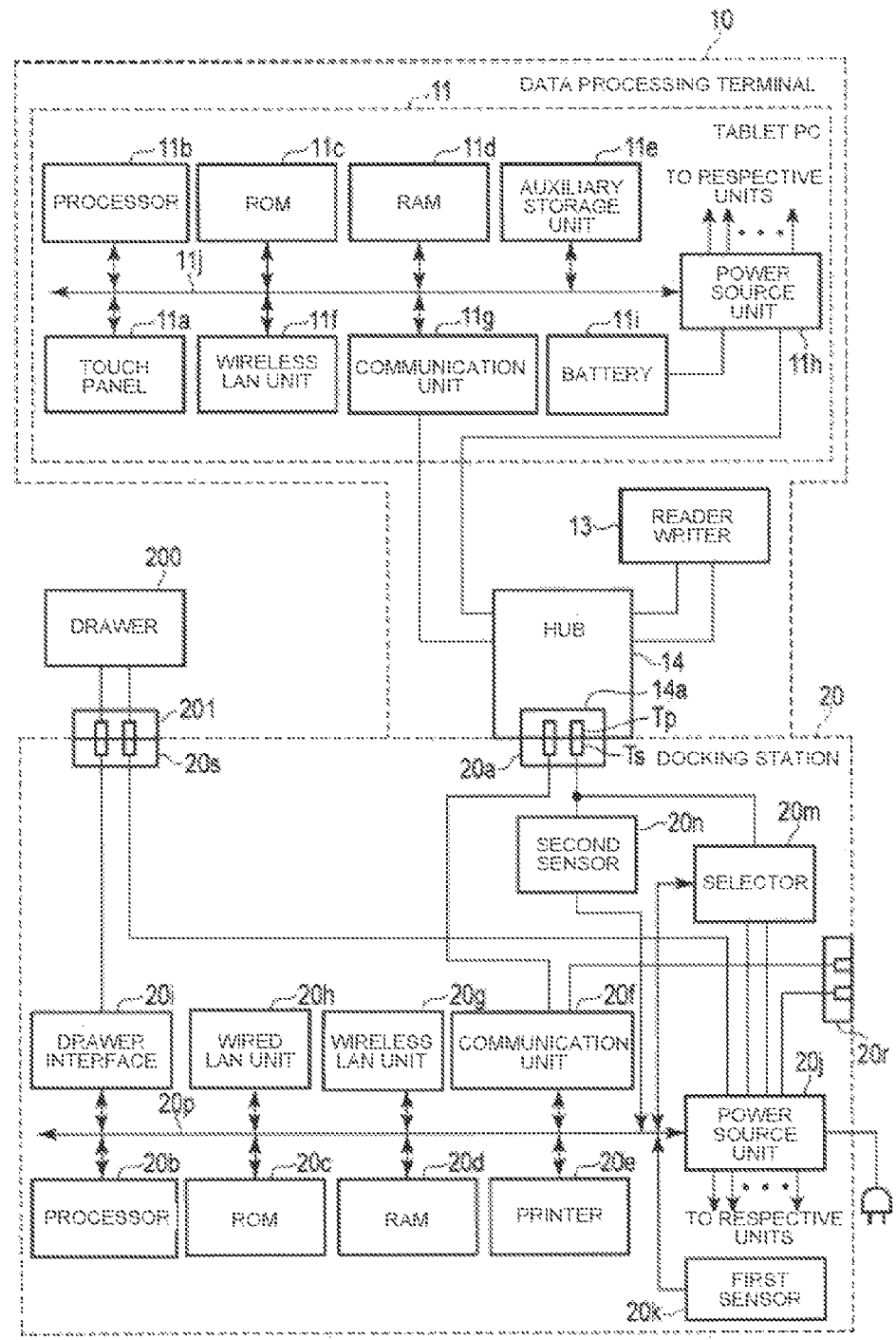
FIG. 6 is a block diagram showing an electrical configuration of the commodity sales data processing apparatus according to the embodiment.

FIG. 6 is a block diagram showing electrical constituent elements of the processing apparatus 100. In addition, in FIG. 6, the same symbols in FIG. 1 to FIG. 5 are given to the same constituent elements as the constituent elements shown in FIG. 1 to FIG. 5.

The data processing terminal 10 further has a hub 14, in addition to the above-described tablet PC 11 and reader/writer 13.

The hub 14 is connected to each of the tablet PC 11 and the reader/writer 13. The hub 14 includes the above-described connector 14*a*. In the above-described mounting state, the hub 14 is connected to the docking station 20.

The tablet PC 11 has a processor 11*b*, in addition to the touch panel 11*a*. The processor 11*b* is a CPU (central processing unit), for example. Further, the tablet PC 11 includes a ROM (read-only memory) 11*c*, a RAM (random-access memory) 11*d*, an auxiliary storage unit 11*e*, a wireless LAN unit 11f, a communication unit 11g, a power source unit 11h, a battery 11i, and a transmission system 11j.

The touch panel 11a includes a display device and a touch sensor. A display screen of the display device is an optional screen such as a GUI screen. The display device is a well-known device such as a color LCD, for example. The touch sensor is arranged to superpose on the display screen of the display device. The touch sensor detects a touch position by an operator to the display screen of the display device, and sends its position information to the processor 11b. The touch sensor is a well-known device.

The processor 11b, the ROM 11c, the RAM 11d and the auxiliary storage unit 11e are connected by the transmission system 11j, to compose a computer.

The processor 11b functions as a central portion of the above-described computer. The processor 11b controls the respective units, in order to realize various operations as the tablet PC 11, based on an operating system, a middleware, and an application program which are stored in the ROM 11c and the RAM 11d.

The ROM 11c functions as a main storage unit of the above-described computer. The ROM 11c stores the above-described operating system. The ROM 11c may store the above-described middleware and application program. Further, the ROM 11c may store data to which the processor 11b refers when performing various processings.

The RAM 11d functions as a main storage unit of the above-described computer. The RAM 11d stores data to which the processor 11b refers when performing various processings. Further, the RAM 11d is used as a so-called work area to store data which the processor 11b temporarily uses when performing various processings.

The auxiliary storage unit 11e functions as an auxiliary storage unit of the above-described computer. The auxiliary storage unit 11e stores data which the processor 11b uses when performing various processings, or data which is to be generated by the processing in the processor 11b. The auxiliary storage unit 11e may store the above-described application program. As the auxiliary storage unit 11e, an EEPROM (electric erasable programmable read-only memory) is typically used. As the auxiliary storage unit 11e, an HDD (hard disk drive), an SSD (solid state drive), or the like may be used.

The application program stored in the ROM 11c or the auxiliary storage unit 11e includes a program for making the processor 11b execute the data processing relating to commodity sales. Accordingly, the processor 11b executes the relevant application program, and thereby the tablet PC 11 functions as a computer to perform the data processing relating to commodity sales.

The wireless LAN unit 11f performs data communication via a wireless LAN. As the wireless LAN unit 11f, an existing communication device or the like based on the standard of IEEE 802.11 series is used, for example. The wireless LAN unit 11f mainly performs wireless data communication with the docking station 20.

The communication unit 11g communicates with the reader/writer 13 and the docking station 20 which are connected thereto via the hub 14. As the communication unit 11g, a USB communication device is used, for example.

The power source unit 11h operates by the power fed from the docking station 20 via the hub 14, in the above-described mounting state. The power source unit 11h operates by the power outputted from the battery 11i, in the above-described separation state. The power source unit 11h feeds power to each of the electrical constituent elements included in the tablet PC 11. The power source unit 11h charges the battery 11i, in the above-described mounting state. The power source unit 11h feeds power to the reader/writer 13, in the above-described separation state.

When power is fed from the power source unit 11h, the battery 11i stores this power. When the power source unit 11h becomes a load, the battery 11i feeds the stored power to the power source unit 11h.

The transmission system 11j transmits data which is transmitted/received among the touch panel 11a, the processor 11b, the ROM 11c, the RAM 11d, the auxiliary storage unit 11e, the wireless LAN unit 11f, the communication unit 11g, and the power source unit 11h.

As the transmission system 11j, a well-known one including various buses such as a system bus, and various interface circuits for connecting these buses and the respective units is used.

The docking station 20 has a processor 20b, in addition to the connector 20a. The processor 20b is a CPU, for example. Further, the docking station 20 includes a ROM 20c, a RAM 20d, a printer 20e, a communication unit 20f, a wireless LAN unit 20g, a wired LAN unit 20h, a drawer interface 20i, a transmission system 20p, and connectors 20r, 20s.

Further, the docking station 20 has a power source device and a sensor.

The power source device includes a power source unit 20j and a selector 20m.

The sensor includes a first sensor 20k and a second sensor 20n.

The connector 20a has a power feeding terminal Ts.

The power feeding terminal Ts is in contact with a power source terminal Tp provided in the connector 14a of the mounted data processing terminal 10, in the above-described mounting state.

The processor 20b, the ROM 20c and the RAM 20d are connected by the transmission system 20p, to compose a computer.

The processor 20b functions as a central portion of the above-described computer. The processor 20b controls the respective units, in order to realize various operations as the docking station 20, based on an operating system, a middleware, and an application program which are stored in the ROM 20c and the RAM 20d.

The ROM 20c functions as a main storage unit of the above-described computer. The ROM 20c stores the above-described operating system. The ROM 20c may store the above-described middleware and application program, for example. Further, the ROM 20c may store data to which the processor 20b refers when performing various processings.

The application program to be stored in the ROM 20c includes a control program which is stated with respect to a control processing described later. Assignment of the docking station 20 is generally performed in the state that the control program is stored in the ROM 20c. But, the docking station 20 may be assigned in the state that the control program is not stored in the ROM 20c, and a control program which has been assigned separately may be written into an auxiliary storage unit to be separately provided. The control program may be assigned in the state to be recorded in a removable recording medium. As the removable recording medium, a magnetic disk, a magneto-optical disk, an optical disk, a semiconductor memory, or the like is used. Further, the control program may be assigned by communication via a network. As the auxiliary storage unit, an EEPROM (electric erasable programmable read-only memory), an HDD (hard disk drive), an SSD (solid state drive), or the like is used, for example.

The RAM 20*d* functions as a main storage unit of the above-described computer. The RAM 20*d* stores data to which the processor 20*b* refers when performing various processings. Further, the RAM 20*d* is used as a so-called work area to store data which the processor 20*b* temporarily uses when performing various processings.

The printer 20*e* is a well-known device, such as a thermal printer or a dot impact printer, for example. The printer 20*e* mainly prints various character strings and images on a receipt sheet, to issue a receipt.

The communication unit 20*f* communicates with the data processing terminal 10 which is connected thereto via the connector 20*a* and an external device which is connected thereto via the connector 20*r*. As the communication unit 20*f*, a USB communication device is used, for example. A port for connecting the data processing terminal 10 is composed by the communication unit 20*f* and the connector 20*a*. In the above-described mounting state, the data processing terminal 10 is connected to this port.

The wireless LAN unit 20*g* performs data communication via a wireless LAN. As the wireless LAN unit 20*g*, an existing communication device or the like based on the standard of IEEE 802.11 series is used, for example. The wireless LAN unit 20*g* mainly performs wireless data communication with the data processing terminal 10. The wireless LAN unit 20*g* functions as a first communication unit.

The wired LAN unit 20*h* performs data communication via a wired LAN. As the wired LAN unit 20*h*, an existing communication device or the like based on the standard of IEEE 802.3 series is used, for example. The wired LAN unit 20*h* mainly performs wired data communication with a POS (point-of-sale) server not shown.

The drawer interface 20*i* mediates communication between the processor 20*b* and a drawer 200 which are connected via the connectors 20*s*, 201.

The power source unit 20*j* of the above-described power source device receives feeding of power from a commercial power source and operates, and feeds power to each of the electrical constituent elements included in the docking station 20. The power source unit 20*j* has two terminals for applying each of an operating voltage and a testing voltage to the power feeding terminal Ts of the connector 20*a*. Each of these two terminals is connected to the selector 20*m*. The operating voltage is a voltage capable of making the function of the data processing terminal 10 to be fully operated, and is 19 V, for example. The testing voltage is a voltage lower than the operating voltage. The testing voltage is preferably sufficiently smaller than the operating voltage, and is 5 V, for example. That is, the power source unit 20*j* functions as first applying means for applying the operating voltage, and second applying means for applying the testing voltage.

The first sensor 20*k* is arranged inside the projecting portion 22, as shown in FIG. 5. The first sensor 20*k* detects locking of the mounting mechanism 30S by the lock mechanism 30R. For example, the first sensor 20*k* detects whether the lock mechanism 30R is in any of the lock state and the unlock state, based on whether or not a portion to be detected 37*k* of the movable plate 37 is positioned at its facing position. As the first sensor 20*k*, a reflection type optical sensor is used, for example. Further, the first sensor 20*k* functions as first detection means for detecting movement of the hooks 31, 32, based on whether or not the portion to be detected 37*k* of the movable plate 37 is positioned at its facing position.

The selector 20*m* of the above-described power source device selectively sets a state of voltage application to the power feeding terminal Ts of the connector 20*a* by the power source unit 20*j* to any of three states, under the control of the processor 20*b*. One of the three states is a state to block the voltage application to the power feeding terminal Ts by the power source unit 20*j*. One of the three states is a state to apply the testing voltage to the power feeding terminal Ts by the power source unit 20*j*. A further one of the three states is a state to apply the operating voltage to the power feeding terminal Ts by the power source unit 20*j*.

The second sensor 20*n* detects an electrical state at the power feeding terminal Ts of the connector 20*a* in the state that the above-described testing voltage is applied thereto by the power source unit 20*j* of the above-described power source device.

For example, the second sensor 20*n* is a detection circuit to detect presence or absence of a current flowing in the power feeding terminal Ts, as the electrical state of the power feeding terminal Ts.

The transmission system 20*p* transmits data which is transmitted/received among the processor 20*b*, the ROM 20*c*, the RAM 20*d*, the printer 20*e*, the communication unit 20*f*, the wireless LAN unit 20*g*, the wired LAN unit 20*h*, the drawer interface 20*i*, the power source unit 20*j*, the first sensor 20*k*, the selector 20*m*, and the second sensor 20*n*. As the transmission system 20*p*, a well-known device including various buses such as a system bus, and various interface circuits for connecting these buses and the respective units is used.

The connector 20*r* electrically connects to a connector not shown which is fitted on a connection cable with an external device not shown.

The connector 20*s* electrically connects to the connector 201 which is fitted on a connection cable with the drawer 200.

In addition, the connectors 14*a*, 20*a*, 20*r*, 20*s*, 201 are schematically shown in FIG. 6, and actually they may have more terminals.

Next, an operation of the processing apparatus 100 configured as described above will be described.

When being in the above-described separation state, the data processing terminal 10 operates using the power stored in the battery 11*i*. When being in the above-described mounting state, the data processing terminal 10 operates using the power fed from the power source unit 20*j* of the power source device. In any of the separation state and the mounting state, the docking station 20 operates using the power which the power source unit 20*j* receives feeding of power from a commercial power source and outputs.

The data processing terminal 10 executes the application program in the tablet PC 11, to perform data processing relating to commodity sales. The data processing relating to commodity sales is a processing which is performed in an existing POS terminal, cash register, or the like. The data processing terminal 10 can perform the above-described data processing, in any of the above-described mounting state and the above-described separation state.

In accordance with that power feeding is started from the power source unit 20*j* of the above-described power source device, the processor 20*b* starts its operation, and when initial setting and so on are completed, the processor 20*b* starts a control processing in accordance with the control program stored in the ROM 20*c*.

In addition, the content of the control processing described below is an example, and the control processing can be used appropriately in various processings in which the similar results can be obtained.

Figure 7:
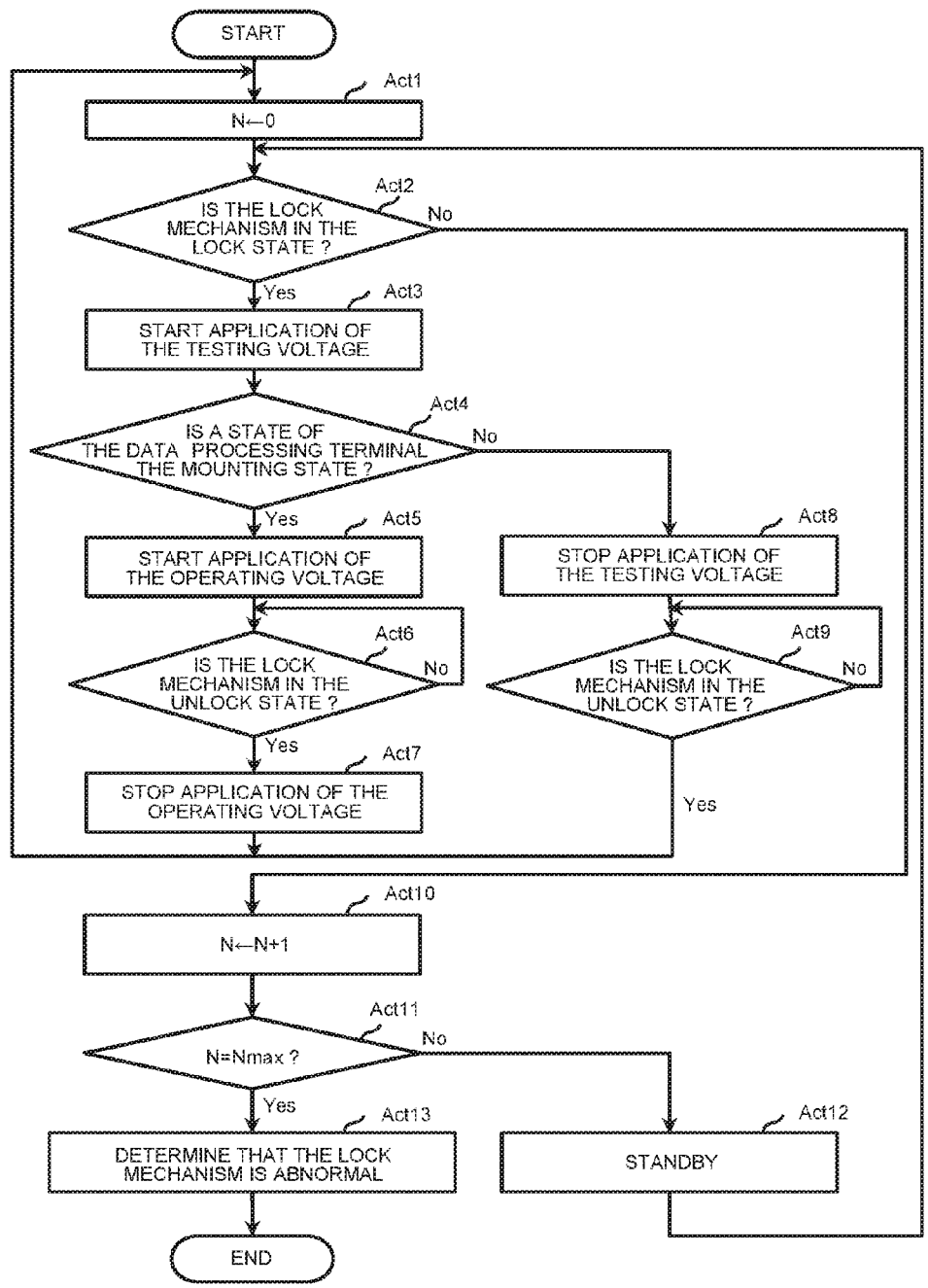
FIG. 7 is a flow chart of a control processing by the CPU included in the docking station of the commodity sales data processing apparatus according to the embodiment.

FIG. 7 is a flow chart of a control processing by the processor 20b.

As shown in FIG. 7, the processor 20b sets "0" to a variable N, in Act1.

In Act2, the processor 20b determines whether or not the lock mechanism 30R is in the lock state, based on the detection result of the first sensor 20k.

In other words, the processor 20b determines whether or not the mounting mechanism 30S is locked by the lock mechanism 30R, based on the detection result of the first sensor 20k.

When it is determined that the lock mechanism 30R is in the lock state, that is the mounting mechanism 30S is locked (Yes in Act3), the processing of the processor 20b proceeds to Act3.

In Act3, the processor 20b controls the above-described power source device, so that the testing voltage is applied to the power feeding terminal Ts.

That is, the processor 20b controls the selector 20m of the power source device, to start application of the testing voltage to the power feeding terminal Ts.

In Act4, the processor 20b determines whether a state of the data processing terminal 10 and the docking station 20 is the above-described mounting state or not (is the above-described separation state?), based on the detection result of the second sensor 20n.

That is, the processor 20b determines whether or not the above-described data processing terminal 10 is mounted on the mounting mechanism 30S.

At this time, the testing voltage which the power source unit 20j of the above-described power source device outputs is applied to the power feeding terminal Ts of the connector 20, via the selector 20m (refer to the above-describe Act3).

For example, when since the state of the data processing terminal 10 and the docking station 20 is in the above-described separation state, the connector 14a is not connected to the connector 20a, the power feeding terminal Ts is in the open state, and current does not flow in the power feeding terminal Ts.

Accordingly, even in the state that the testing voltage is applied to the power feeding terminal Ts, the second sensor 20n does not detect a current flowing in the power feeding terminal Ts, in the above-described separation state.

On the other hand, in the above-described mounting state, the connector 14a is connected to the connector 20a, and the power source terminal Tp is in contact with the power feeding terminal Ts, as shown in FIG. 6.

Accordingly, the testing voltage is applied to the power feeding terminal Ts, and thereby current flows in the power feeding terminal Ts. By this means, the second sensor 20n detects the above-described current.

That is, even in the state that the testing voltage is applied to the power feeding terminal Ts, the second sensor 20n does not detect the current, in the above-described separation state, and the second sensor 20n detects the current, in the above-described mounting state.

Accordingly, in Act4, the processor 20b determines whether or not the data processing terminal 10 is mounted on the mounting mechanism 30S of the docking station 20, based on the detection result of the above-described current by the second sensor 20n.

That is, when the second sensor 20n detects the above-described current, the processor 20b determines that the data processing terminal 10 is mounted on the mounting mechanism 30S of the docking station 20 (mounting state).

When the second sensor 20n does not detect the above-described current, the processor 20b determines that the data processing terminal 10 is not mounted on the mounting mechanism 30S of the docking station 20 (separation state).

When it is determined that the data processing terminal 10 is mounted on the mounting mechanism 30S (Yes in Act4), the processing of the processor 20b proceeds to Act5. In other words, the processor 20b executes the control processing of Act4 based on the control program, and thereby the computer which has the processor 20b as its central portion functions as the first detection means.

In Act5, the processor 20b controls the above-described power source device so that an operating voltage is applied to the power feeding terminal Ts of the connector 20a.

That is, the processor 20b controls the selector 20m of the power source device, to start application of the operating voltage to the power feeding terminal Ts.

At this time, since the state of the data processing terminal 10 and the docking station 20 is in the above-described mounting state, the above-described operating voltage is fed to the data processing terminal 10.

In Act6, the processor 20b determines whether or not the lock mechanism 30R is in the unlock state, based on the detection result of the first sensor 20k.

In other words, the processor 20b determines whether or not the mounting mechanism 30S is not locked by the lock mechanism 30R, based on the detection result of the first sensor 20k.

Here, when the lock mechanism 30R becomes in the lock state once, the lock state is maintained, unless the cylinder lock 36 is unlocked by a specific operation by an operator. In addition, in the above-described Act2, it has been determined already that the lock mechanism 30R is in the lock state.

Accordingly, the processor 20b determines that the lock state of the lock mechanism 30R is detected (No in Act6), and repeats the processing of Act 6.

That is, the processor 20b waits for the lock state of the lock mechanism 30R to change to the unlock state, based on the detection result of the first sensor 20k.

On the other hand, when the cylinder lock 36 is unlocked by the specific operation by the operator, the lock mechanism 30R changes from the lock state to the unlock state.

When it is determined that the lock mechanism 30R is in the unlock state, namely, the mounting mechanism 30S is not locked (Yes in Act6), the processing of the processor 20b proceeds to Act7.

In Act7, the processor 20b controls the above-described power source device, so that the operating voltage is not applied to the power feeding terminal Ts of the connector 20a.

That is, the processor 20b controls the selector 20m of the power source device, to stop application of the operating voltage to the power feeding terminal Ts.

In addition, when the lock mechanism 30R becomes in the unlock state, the hooks 31, 32 become in the state capable of getting out of the openings 12b, 12c. That is, an operator performs a slide operation of the slide button 35, and thereby becomes able to demount the data processing terminal 10 from the docking station 20.

When the data processing terminal 10 is demounted from the docking station 20, and the data processing terminal 10 and the docking station 20 become in the above-described separation state, the power feeding terminal Ts of the connector 14a is exposed outside.

But at this time, since the application of the above-described operating voltage to the power feeding terminal Ts of the connector 20a is stopped, there is no danger even if an operator touches the power feeding terminal Ts.

That is, the processor 20*b* executes this control processing based on the control program, and thereby the computer having the processor 20*b* as its central portion functions as changing means for changing the voltage application state of the power feeding terminal Ts.

On the other hand, in the above-described Act4, when it is determined that the data processing terminal 10 is not mounted on the mounting mechanism 30S of the docking station 20 (separation state) (No in Act4), the processing of the processor 20*b* proceeds to ActB.

At this time, in spite that the state of the data processing terminal 10 and the docking station 20 is not in the above-described mounting state, the voltage comes to be applied to the power feeding terminal Ts which is exposed outside. But the voltage applied to the power feeding terminal Ts is the above-described testing voltage, and also is a voltage lower than the above-described operating voltage. For this reason, compared with the case that an operator touches the power feeding terminal Ts in the state that the operating voltage is still applied, a risk in the case that the operator touches the above-described power feeding terminal Ts is smaller. Particularly, in the present embodiment, since the testing voltage is of such a sufficiently low voltage value as 5 V, there is no danger even if an operator touches the power feeding terminal Ts. In addition, it is only necessary that the testing voltage has such a voltage value that a current generated in the power feeding terminal Ts in the above-described mounting state becomes large enough to be surely detected by the second sensor 20*n*.

In ActB, the processor 20*b* controls the above-described power source device, so that the testing voltage is not applied to the power feeding terminal Ts of the connector 20*a*.

That is, the processor 20*b* controls the selector 20*m* of the power source device, to stop application of the testing voltage to the power feeding terminal Ts.

When the application of the testing voltage to the power feeding terminal Ts is stopped, the processing of the processor 20*b* proceeds to Act9.

In Act9, the processor 20*b* determines whether or not the lock mechanism 30R is in the unlock state, based on the detection result of the first sensor 20*k*.

In other words, the processor 20*b* determines whether or not the mounting mechanism 30S is not locked by the lock mechanism 30R, based on the detection result of the first sensor 20*k*.

On the other hand, in the above-described Act2, it has been determined already that the lock mechanism 30R is in the lock state.

Accordingly, the processor 20*b* determines that the lock state of the lock mechanism is detected (No in Act9), and repeats the processing of Act9.

That is, the processor 20*b* waits for the state of the lock mechanism 30R to change to the unlock state, based on the detection result of the first sensor 20*k*.

At this time, the data processing terminal 10 and the docking station 20 are in the above-described separation state, as determined in the above-described Act4.

In order to set the above-described separation state to the above-described mounting state, an operator firstly unlocks the cylinder lock 36, to set the lock state of the lock mechanism 30R to the unlock state.

At this time, the first sensor 20*k* detects the unlock state of the lock mechanism 30R, in accordance to the position of the portion to be detected 37*k* of the movable plate 37.

The processor 20*b* determines that the lock mechanism 30R is in the unlock state, based on the detection result of the first sensor 20*k*.

When unlocking the cylinder lock 36 as described above, the operator next places the data processing terminal 10 on the placing surface 22*a* of the table 22 of the docking station 20.

Further, the operator presses the surface where the openings 12*b*, 12*c* of the data processing terminal 10 are provided to the side of the projecting portion 22*b* of the table 22.

Then, the hooks 31, 32 move from the above-described first positions to the above-described second positions, by the action of the tapers formed on the protrusions 31*a*, 32*a*, and then the protrusions 31*a*, 32*a* of the hooks 31, 32 enter into the openings 12*b*, 12*c*, respectively.

The protrusions 31*a*, 32*a* enter into the openings 12*b*, 12*c*, and thereby the hooks 31, 32 engage with the openings 12*b*, 12*c*, respectively.

When the protrusions 31*a*, 32*a* engage with the openings 12*b*, 12*c*, and also by the energization of the spring 34, the hooks 31, 32 return to the first positions (positions shown in FIG. 5), respectively.

When the hooks 31, 32 are positioned at the first positions to engage with the openings 12*b*, 12*c*, respectively, the docking station 20 becomes in the above-described mounting state from the above-described separation state.

In addition, an operator performs a sliding operation of the slide button 35, and thereby the above-described mounting state can be returned to the above-described separation state.

As described above, the hooks 31, 32 function as movable members which move when the above-described separation state changes to the above-described mounting state, or the above-described mounting state changes to the above-described separation state.

When it is determined in Act6 or Act9 that the lock mechanism 30R is in the unlock state (Yes in Act6 or Act9), the processing of the processor 20*b* returns to Act1. The processor 20*b* repeats the processings of Act1 and later in the same manner as described above.

At this time, when the lock mechanism 30R returns to the lock state from the unlock state, the processor 20*b* repeats the processings of Act3 to Act9.

However, when the unlock state of the lock mechanism 30R continues, it is determined in Act2 that the lock mechanism 30R is in the unlock state (No in Act2), and the processing of the processor 20*b* proceeds to Act10.

In Act10, the processor 20*b* increases the value of the variable N by one.

In Act11, the processor 20*b* determines whether or not the variable N is equal to a predetermined maximum value Nmax.

When it is determined that the variable N is not equal to the maximum value Nmax (No in Act11), the processing of the processor 20*b* proceeds to Act12.

In Act12, the processor 20*b* stands by for a predetermined time.

After the standby, the processing of the processor 20*b* returns to Act2.

That is, when the lock mechanism 30R is in the unlock state, the processor 20*b* repeatedly determines at fixed time intervals whether or not the lock mechanism 30R has become in the lock state.

Usually, a term in which the lock mechanism 30R is maintained in the unlock state is short. Before the variable N becomes equal to Nmax, the cylinder lock 36 is locked by an operator, and thereby the lock mechanism 30R becomes in the lock state.

Accordingly, in the usual state, the processor 20b determines that the lock mechanism 30R is in the lock state, in Act2 (Yes in Act12).

However, when the unlock state continues, until the variable N becomes equal to the maximum value Nmax, the processor 20b determines that the variable N is equal to the maximum value Nmax, in Act11.

When it is determined that the variable N is equal to the maximum value Nmax (Yes in Act11), the processing of the processor 20b proceeds to Act13.

In addition, the maximum value Nmax and the standby time in Act12 can be optionally determined by an operator or the like of the docking station 20, for example.

In Act13, the processor 20b determines that the lock mechanism 30R is abnormal, and finishes the control processing shown in FIG. 7.

The processor 20b executes the control processing of the above-described Act13, based on the control program, and thereby the computer having the processor 20b as its central portion functions as determination means for determining that the lock mechanism 30R is abnormal.

In the above-described Act13, the processor 20b notifies the tablet PC 11 of the data processing terminal 10, for example, of the fact that the lock mechanism 30R is abnormal.

In the data processing terminal 10 which has received this notification, the processor 11b performs an error display on the touch panel 11a.

But the treatment after it is determined that the lock mechanism 30R is abnormal may be optional.

For example, the docking station 20 may blink a power source lamp or an indicator lamp not shown.

Or, the docking station 20 may be provided with a display device or a pronunciation device not shown, and may perform an alarm operation using them.

Or, the docking station 20 may notify a management terminal not shown, of the above-described abnormality, via the wired LAN unit 20h.

In addition, since the lock mechanism 30R is in the unlock state, the operating voltage is never applied to the power feeding terminal Ts from the power source unit 20j of the above-described power source device, via the selector 20m.

For this reason, the processor 11b of the tablet PC 11 might not recognize the connection with the docking station 20.

Therefore, when the processor 20b performs the notification of the fact that the lock mechanism 30R is abnormal to the tablet PC 11, it is desirable that the processor 20b performs the above-described notification of abnormality, by wireless communication via the wireless LAN units 20g, 11f.

When a plurality of the data processing terminals 10 are present, the processor 20b may perform the above-described notification of abnormality to the data processing terminal 10 which is previously determined out of these.

As described above, according to the docking station 20, whether or not to be in the mounting state is determined, based on change in the electrical states at the power feeding terminal Ts, in the mounting state and the separation state. Accordingly, the docking station 20 can properly determine the mounting status of the data processing terminal 10.

Further, according to the docking station 20, it is possible to properly control the power feeding to the data processing terminal 10, under the proper determination like this.

Further, according to the docking station 20, in order to confirm change in the electrical states at the power feeding terminal Ts, the testing voltage which is lower than the operating voltage for operating the data processing terminal 10 is used. Accordingly, the docking station 20 can determine the mounting state of the data processing terminal 10, in a high safety state.

Further, according to the docking station 20, the testing voltage is applied only when it is determined that the lock mechanism 30R is in the lock state. Further, the operating voltage is applied to the power feeding terminal Ts, only when it is determined that the lock mechanism 30R is in the lock state, and the data processing terminal 10 is mounted. Accordingly, the safety when the docking station 20 is in the separation state can be enhanced.

The embodiment as described above can be embodied in the following modification.

The data processing terminal 10 may be configured without using the tablet PC 11. In addition, the data processing terminal 10 may be configured by only the tablet PC 11.

It is only necessary that the docking station 20 has at least a function to feed power to the data processing terminal 10, and what function the docking station 20 has as other functions is optional.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. In a docking station on which a portable data processing terminal is to be detachably mounted, the docking station, comprising:

a mounting mechanism which has a first movable member to operate in accordance with mounting of the data processing terminal and demounting of the data processing terminal, and on which the data processing terminal is to be mounted;

a lock mechanism which regulates movement of the first movable member, to lock the mounting mechanism;

a power feeding terminal which comes in contact with a power source terminal provided in the data processing terminal, when the data processing terminal is mounted on the mounting mechanism;

a power source device which applies an operating voltage of the data processing terminal and a testing voltage lower than the operating voltage to the power feeding terminal;

a first sensor which detects locking of the mounting mechanism by the lock mechanism;

a second sensor which detects an electrical state of the power feeding terminal in a state that the testing voltage is applied thereto by the power source device; and a processor which, when having determined that the mounting mechanism is locked based on a detection result of the first sensor, controls the power source device, so that the testing voltage is applied to the power feeding terminal, and when having determined that the mounting mechanism is locked and further having determined that the data processing terminal is mounted on the mounting mechanism based on a detection result by the second sensor, controls the power source device, so that the operating voltage is applied to the power feeding terminal.

2. The docking station according to claim 1, wherein:
the second sensor detects presence or absence of a current flowing in the power feeding terminal, as the electrical state of the power feeding terminal; and
the processor determines that the power feeding terminal and the power source terminal are in contact with each other, based on a result that the second sensor detects that the current flowing in the power feeding terminal is present.

3. The docking station according to claim 1, wherein:
the lock mechanism becomes in a lock state to lock the mounting mechanism and in an unlock state not to lock the mounting mechanism, by a specific operation by an operator.

4. The docking station according to claim 1, wherein:
the mounting mechanism has a hook movable between a first position and a second position, as the first movable member;
the first position is a position where, in a mounting state that the data processing terminal is mounted on the mounting mechanism, the hook engages with the data processing terminal, and in a separation state that the data processing terminal is not mounted on the mounting mechanism, the hook stands by; and
the second position is a position which is separated from the first position, and to which the hook moves, when a state of the mounting mechanism changes from the mounting state to the separation state, and when the state of the mounting mechanism changes from the separation state to the mounting state.

5. The docking station according to claim 4, wherein:
the lock mechanism regulates movement of the hook from the first position to the second position, to lock the mounting mechanism, so that the data processing terminal is not demounted, when the data processing terminal is mounted on the mounting mechanism.

6. The docking station according to claim 5, wherein:
the lock mechanism regulates the movement of the hook from the first position to the second position, to lock the mounting mechanism, so that the data processing terminal is not mounted, when the data processing terminal is not mounted on the mounting mechanism.

7. The docking station according to claim 5, wherein:
the lock mechanism has a second movable member which is movable between a regulation position to regulate the movement of the hook and a non-regulation position not to regulate the movement of the hook.

8. The docking station according to claim 7, wherein:
the second movable member has a portion to be detected which is to be detected by the first sensor; and
the first sensor detects whether the second movable member is positioned at the regulation position, or positioned at the non-regulation position, in accordance with a detection state of the portion to be detected.

9. A commodity sales data processing apparatus, comprising:
a portable data processing terminal which performs a data processing relating to commodity sales; and
a docking station on which the data processing terminal is to be detachably mounted;
the docking station comprising:
a mounting mechanism which has a first movable member to operate in accordance with mounting of the data processing terminal and demounting of the data processing terminal, and on which the data processing terminal is to be mounted;
a lock mechanism which regulates movement of the first movable member, to lock the mounting mechanism;
a power feeding terminal which comes in contact with a power source terminal provided in the data processing terminal, when the data processing terminal is mounted on the mounting mechanism;
a power source device which applies an operating voltage of the data processing terminal and a testing voltage lower than the operating voltage to the power feeding terminal;
a first sensor which detects locking of the mounting mechanism by the lock mechanism;
a second sensor which detects an electrical state of the power feeding terminal in a state that the testing voltage is applied thereto by the power source device; and
a processor which, when having determined that the mounting mechanism is locked based on a detection result of the first sensor, controls the power source device, so that the testing voltage is applied to the power feeding terminal, and
when having determined that the mounting mechanism is locked and further having determined that the data processing terminal is mounted on the mounting mechanism based on a detection result by the second sensor, controls the power source device, so that the operating voltage is applied to the power feeding terminal.

10. In a control method of a docking station having a mounting mechanism on which a data processing terminal is to be mounted, a lock mechanism which regulates movement of the mounting mechanism, to lock the mounting mechanism, and a power feeding terminal which comes in contact with a power source terminal provided in the data processing terminal, when the data processing terminal is mounted on the mounting mechanism, the control method comprising:
determining whether or not the mounting mechanism is locked by the lock mechanism;
applying a testing voltage which is lower than an operating voltage of the data processing terminal to the power feeding terminal, when it is determined that the mounting mechanism is locked by the determination of locking;
detecting an electrical state of the power feeding terminal in a state that the testing voltage is applied thereto, and determining whether or not the data processing terminal is mounted on the mounting mechanism, based on this detection result; and
applying the operating voltage to the power feeding terminal, when it is determined that the data processing terminal is mounted on the mounting mechanism, based on the determination of mounting.

* * * * *